(12) United States Patent
Chang et al.

(10) Patent No.: US 10,503,773 B2
(45) Date of Patent: Dec. 10, 2019

(54) TAGGING OF DOCUMENTS AND OTHER RESOURCES TO ENHANCE THEIR SEARCHABILITY

(71) Applicant: Sony Corporation, Tokyo (JP)

(72) Inventors: Michael Chang, San Diego, CA (US); Jesse Gallup, San Marcos, CA (US)

(73) Assignee: Sony Corporation, Tokyo (JP)

( * ) Notice: Subject to any disclaimer, the term of this patent is extended or adjusted under 35 U.S.C. 154(b) by 541 days.

(21) Appl. No.: 14/246,554

(22) Filed: Apr. 7, 2014

(65) Prior Publication Data

US 2015/0286722 A1    Oct. 8, 2015

(51) Int. Cl.
*G06F 16/40*    (2019.01)
*G06F 16/48*    (2019.01)

(52) U.S. Cl.
CPC ................. *G06F 16/48* (2019.01)

(58) Field of Classification Search
CPC .............. G06F 17/30864; G06F 17/30867
See application file for complete search history.

(56) References Cited

U.S. PATENT DOCUMENTS

| 7,571,050 | B2 | 8/2009 | Liebling | |
|---|---|---|---|---|
| 7,640,160 | B2 | 12/2009 | Di Cristo | |
| 2007/0008321 | A1* | 1/2007 | Gallagher | G06F 17/30265 345/473 |
| 2007/0061364 | A1* | 3/2007 | Klein, Jr. | G06F 17/30038 |
| 2007/0124293 | A1* | 5/2007 | Lakowske | G06F 17/30743 |
| 2011/0119243 | A1 | 5/2011 | Diamond et al. | |
| 2011/0173208 | A1* | 7/2011 | Vogel | G10L 25/48 707/746 |
| 2012/0206566 | A1* | 8/2012 | Fedoseyeva | G06Q 10/06398 348/38 |
| 2013/0054645 | A1* | 2/2013 | Bhagavathy | G06F 16/783 707/780 |
| 2013/0246409 | A1* | 9/2013 | Polansky | G06F 17/30241 707/724 |
| 2014/0129570 | A1* | 5/2014 | Johnson | H04N 21/4126 707/748 |

(Continued)

OTHER PUBLICATIONS

IBM, "A Method to Exploit Metadata of Unstructured Information for Search and Classification", An IP.com Prior Art Database Technical Disclosure, 4 pages.*

(Continued)

*Primary Examiner* — Loc Tran
(74) *Attorney, Agent, or Firm* — Mayer & Williams PC; Karin L. Williams

(57) ABSTRACT

The ability to search for content such as documents and other resources is enhanced through the use of two external sources of information. Each of the external sources may provide information (e.g., metadata) that may be employed as searchable tags that may be used by a search engine to locate the resources. A first level of tags may be obtained in a variety of different ways. For example, information extracted from a resource may be sent to a metadata service provider which can provide suitable metadata associated with the resource. This metadata, which may serve as the first level of tags, may be subsequently sent to a second metadata service provider to obtain additional metadata that may serve as the second level of tags.

6 Claims, 3 Drawing Sheets

(56) References Cited

U.S. PATENT DOCUMENTS

2014/0143241 A1* 5/2014 Barello ............... G06F 17/3089
                                                              707/724
2015/0269200 A1* 9/2015 Beckhardt ............... G06F 16/68
                                                              707/792

OTHER PUBLICATIONS

Authors et. al.: IBM, Original Publication Date: Dec. 19, 2006, IP.com No. IPCOM000144129D, IP.com Electronic Publication: Dec. 19, 2006, "A Method to Exploit Metadata of Unstructured Information for Search and Classification", 4 pages.

* cited by examiner

TAGGING OF DOCUMENTS AND OTHER RESOURCES TO ENHANCE THEIR SEARCHABILITY

BACKGROUND

Recent attempts have been made to facilitate the indexing and storing of user documents and other resources, such as word processing documents, emails, music, etc. Applications such as Google Desktop Search, Copernic Desktop Search, and Apple Computer, Inc.'s Safari typically crawl designated portions of a user's local storage and maintain an index of searchable documents identified therein.

Nevertheless, it remains a challenge to find and manage content stored locally on a user's computer or other storage medium, particularly as the amount of content increases and the nature of that content becomes more diverse.

SUMMARY

In accordance with one aspect of the invention, the ability to search for content such as documents and other resources is enhanced through the use of two external sources of information. Each of the external sources may provide information (e.g., metadata) that may be employed as searchable tags that may be used by a search engine to locate the resources. A first level of tags may be obtained in a variety of different ways. For example, information extracted from a resource may be sent to a metadata service provider which can provide suitable metadata associated with the resource. This metadata, which may serve as the first level of tags, may be subsequently sent to a second metadata service provider to obtain additional metadata that may serve as the second level of tags.

In one illustrative example, the searchability of a file containing a musical selection may be enhanced by first sending a unique ID associated with the music file to an online database that can provide metadata such as the name of the artist and the name of the album from which the musical selection was obtained. This metadata may be used to create tags that facilitate the ability to locate the file through the use of a search engine. This metadata may then be sent to another online database that may provide the lyrics to the musical selection. The lyrics may be employed as additional metadata that may be used to create additional tags that also may be used to facilitate the ability to locate the file through the use of a search engine.

In accordance with another aspect of the invention, a search augmentation system is disclosed. The system includes a metadata request module, a search augmentation module and a metadata association module. The metadata request module is configured to obtain a first set of metadata associated with a resource stored on a computer-readable storage medium. The metadata request module is further configured to use the first set of metadata to obtain a second set of metadata. The search augmentation module is configured to create at least a first searchable tag from the first set of metadata and at least a second searchable tag from the second set of metadata. The metadata association module is configured to associate the first and second tags with the resource. The search augmentation module is also configured to store the first and second tags and the association between the first and second tags and the resource such that the first and second tags and the resource are retrievable by a search engine.

DETAILED DESCRIPTION

Overview

More and more types of resources such as documents and the like employ metadata so that they are searchable via search engines. Consistent with implementations described herein, it may be beneficial to enable storing and searching of these resources in an efficient and simple manner.

Systems and methods consistent with embodiments described herein may facilitate retrieval of resources and assignment of relevant metadata information to the resources.

Various embodiments contemplate associating searchable tags with the resources based on the content of the resources. Such an approach may allow the tagged data to be searched efficiently by searching the tags rather than just the primary data itself.

Various embodiments contemplate the generated tags to be searchable so that the resources may be retrieved. For example, the resources and associated tags may be stored in a database. The database may be searched for one or more tags based upon a query. Each query may include one or more keywords. Tags that match the query may be retrieved from the database and presented to a user in a suitable manner.

The term "resource" is used herein to refer to any item that may be stored on computer-readable storage medium. A non-exhaustive list of examples is: document, email, email thread, text snippet, image, video clip, audio file, spreadsheet, file, a tangible object with a unique digital reference, window, web page, URL, a contact from an address list, a code fragment, a system folder and an activity (for example, an activity may be a sub-task of a larger activity).

Figure 1:
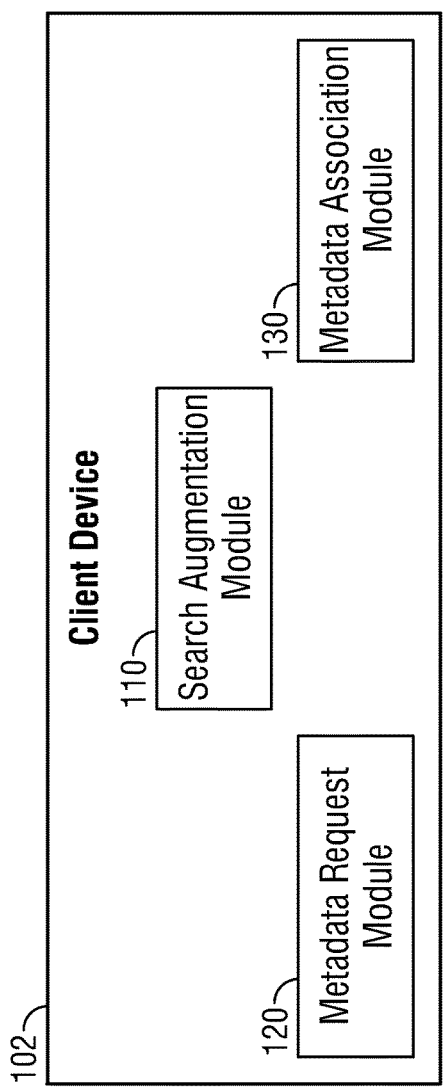
FIG. 1 shows a functional block diagram of a system for enhancing the searchability of resources available to a client device.

FIG. 1 shows a functional block diagram of a system for enhancing the searchability of resources available to a client device. The system includes search augmentation module 110, metadata request module 120 and metadata association module 130. As explained in detail below, search augmentation module 110 obtains metadata describing resources stored in a computer-readable storage medium such as a hard disk or the like. In some cases the metadata request module 120 may be used to obtain the metadata from an online database. The search augmentation module 110 generates searchable tags from the metadata and provides the searchable tags to the metadata association module 130. The metadata association module 130, in turn, associates the searchable tags with the resources they respectively describe so that a search engine searching for a particular resource is able to search both the resource itself and the tag(s) associated therewith.

It should be noted the particular architecture depicted in FIG. 1 is merely exemplary of one implementation of the subject matter disclosed herein. The functional elements and method steps described herein are provided as illustrative examples of one technique for implementing the disclosed subject matter. One skilled in the art will recognize that many other implementations are possible without departing from the subject matter recited in the claims. Likewise, the particular naming of the modules, protocols, features, attributes, or any other aspect is not mandatory or significant, and the mechanisms that implement the disclosed subject matter or its features may have different names or formats.

Illustrative Methods of Obtaining Metadata

Figure 2:
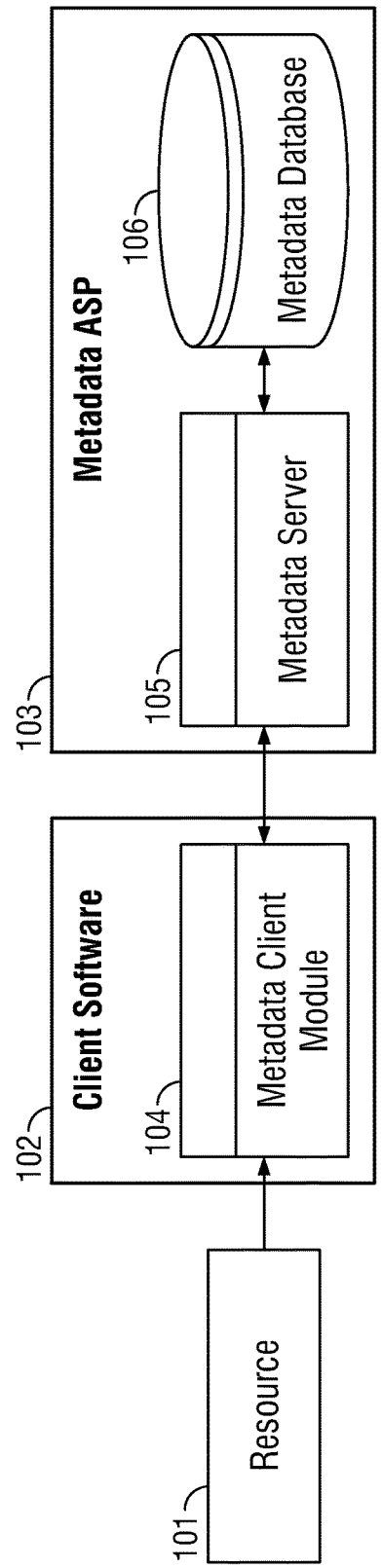
FIG. 2 depicts a system for obtaining metadata from a remote server using the metadata request module shown in FIG. 1.

FIG. 2 depicts a system for obtaining metadata from a remote server using the metadata request module 120. A resource 100 is accessed by a metadata client module 104 residing on a client device 102 is any conventional method, such as reading a digital audio file from a hard drive or a compact disc. Information is extracted from resource 100. The type of information that is extracted will depend on the nature of the resource. For instance, if the resource is an audio CD, the information that is extracted may include a Disc ID, which can be obtained from the table of contents (TOC) included on the CD. Likewise, if the information is extracted from a digital audio file (e.g., an MP3 file), a unique ID may be obtained from an ID3 tag or the like. Alternatively, if the resource is a digital video file, the information may be extracted from another type of standard or non-standard tag.

The aforementioned information that is extracted from the resource may be referred to as a machine tag, which refers to information that employs a special syntax that allows it to be interpreted by a computer program. For instance, another type of machine tag that may be extracted, particularly when the resource is a photographic image, is a geotag. A geotag usually consists of latitude and longitude coordinates, though they may also include altitude, bearing, distance, accuracy data, and place names. Yet another example of a machine tag is a taxonomic tag for conveying taxonomic information identifying a plant or animal species appearing in an image. In general, a machine tag cannot be interpreted by a user without machine translation.

In the aforementioned examples the information extracted from the resources is information from as a machine tag that is encoded along with the actual content in the resource. Alternatively, in other examples, the extracted information may include samples of the content itself. For example, fingerprint techniques may be employed to identify a content sample by examining intrinsic properties of the content and is thus independent of format.

The fingerprinting process generally employs an algorithm for performing a mathematical transform on the content to obtain a spectrogram. Spectral peaks in the spectrogram can be selected for comparison against known fingerprints. For example, in the case of audio, suitable algorithms may be used to quantify tempo, loudness, bass, pitch, brightness, bandwidth and Mel-frequency cepstral coefficients and the like. In the case of video, suitable algorithms may be used to quantify brightness, resolution, color or color distribution, scene change tempo and the like.

As part of a request for metadata, the metadata client module 104 sends the machine tag or other extracted information to a remote metadata service provider 103 over a network connection. For example, the request may be sent over the Internet using the Hypertext Transfer Protocol (HTTP) as a transfer protocol. Metadata server 105 receives the quest and runs a query on its metadata database 106 to find a metadata record that matches the extracted information provided by the client device 102. Metadata database 106 provides the metadata, which is then transmitted back to metadata client module 104. Metadata client module 104, in turn, makes the metadata available to one or more applications residing on the client device 102.

The metadata that is provided by the metadata server 105 will depend on the nature of the resource. For instance, if the resource is an audio file containing music, the metadata may include basic metadata (e.g., artist, album, and track names) as well as extended data (e.g., genre, label, etc.). Likewise, if the resource is an image that has been geotagged, the metadata may include a location name (e.g., country, town, city, landmark, etc.).

Illustrative Method of Obtaining Additional Metadata

In order to increase the effectiveness of search tools and make it easier to find a desired resource, a second level of metadata is obtained based on a previously obtained, first level of metadata. Like the first level of metadata, this second level of metadata may be used to generate searchable tags that can be used when searching for a resource.

By way of example, if searchable tags are to be generated for a resource that is a music file, the metadata request module 120 may extract information from file such as a unique ID, and use this information to obtain a first level of metadata such as the names of the artist, album, and individual tracks from a first metadata service provider. This metadata is provided to the search augmentation module 110 to generate searchable tags that can be associated with the resources. In addition, this metadata may be used by the search augmentation module 110 to obtain a second level of metadata from a second metadata service provider. For instance, the search augmentation module 110 may request that the metadata request module 120 use the names of the artist, album, and individual tracks to obtain the lyrics to the various tracks from another metadata service provider. This second level of metadata may then be used by the search augmentation module 110 to generate additional searchable tags that can be associated with the resources. In this way the user is able to locate and retrieve the music file by using the name of the artist, album or individual tracks as the search terms or by using any of the lyrics to the songs in the individual tracks as search terms.

As another example, if the resource is a photographic image taken with a GPS-equipped camera, the information extracted from the image may be a geotag that includes the latitude and longitude of the location from which the image was taken. In this case the first level of metadata that is obtained may be a location that is determined from the latitude and longitude coordinates. For instance, the first level of metadata may identify the location as Yosemite National Park. This first level of metadata may be used to obtain a second level of metadata, which may include, for example, various well-known landmarks within Yosemite National Park such as "Half-Dome" or "El Capitan." The photographic image may be tagged with both the first and second levels of metadata. In this case, although the image was taken in Yosemite National Park, it may not necessarily include "Half-Dome" or "El Capitan." In any case, a search for "Half-Dome" or "El Capitan" allows this resource to be located since it is related to "Half-Dome" or "El Capitan" (since it was taken in Yosemite National Park), even if it is not exactly what the user was searching for. In this way even if a user only remembers a particular landmark they will still be able to locate photographic images that relate to the greater region.

Illustrative Method of Associating Tags with Resources

Figure 3:
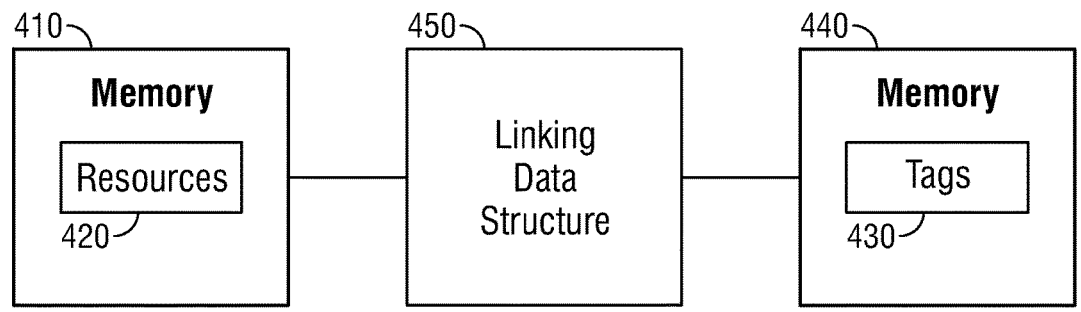
FIG. 3 shows one example of an arrangement for associating the searchable tags and their respective resources.

Once the search augmentation module 110 has obtained the first and second levels of metadata it processes the metadata into a format that allows it to be stored as a searchable tag. The association between the searchable tags and their respective resources are performed by metadata association module 130. FIG. 3 shows a memory 410 that stores resources 420. The searchable tags 430 generated by the search augmentation module 110 are stored in memory 440, which may the same or different from the memory 410 in which the resources are stored. The metadata association module 130 establishes a linking data structure 450 which stores references to the resources 420. The references may be addresses, links, URIs, file paths or other indications of the identity and/or locations where the resources 420 are stored. The linking data structure 450 also associates one or more of the searchable tags 430 with the resources 420. The tags themselves may remain stored at a separate location from the resources with which they are respectively associated. Alternatively, the searchable tags 430 may be embedded with the resources 420 with which they are respectively associated. More generally, the association between the resources and the searchable tags may be accomplished by any techniques known in the art, and is not limited by any particular association technique discussed herein.

Exemplary Search Processing

Figure 4:
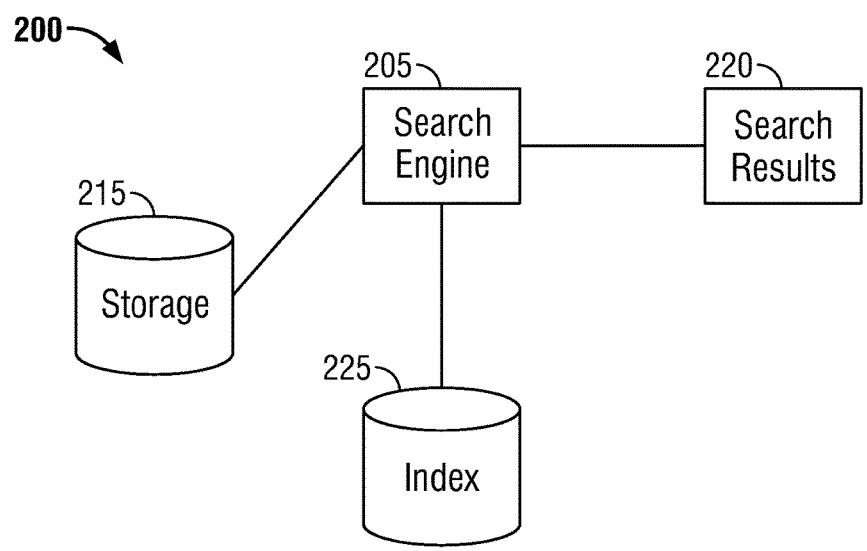
FIG. 4 shows one example of a system and process for searching for resources that are tagged in accordance with aspects of the subject matter described herein.

FIG. 4 shows one example of a system and process for searching for resources that are tagged in accordance with aspects of the subject matter described herein. As illustrated, the system 200 includes a search engine 205, and storage 215. Logically, the search engine 205 searches the resources stored in the storage 215 to generate the search results 220.

The search engine 205 may be hosted on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the search engine 205 comprises the computer-based device 300 of FIG. 6.

The storage 205 may be internal, external, or include components that are both internal and external to an apparatus hosting the search engine 205. The storage may include one or more physical devices that are of the same or different types.

In responding to a query, the search engine 205 may logically search the files of the storage 215. The term "logically" is used as there may be many ways to search the contents of the storage 215. For example, in one implementation, the search engine 205 may search each resource of the storage 215 as well as the searchable tags associated with those resources, regardless of whether those tags are embedded with the resources or stored separately from the resources. If a resource satisfies the conditions of the query, an indicator of the resource (e.g., the resource name may be included in the search results 220.

As another example, the search engine 205 may search the storage 215 by searching the index 225. The index 225 may include a set of keywords that are mapped to one or more of the resources in the current storage 215 as well as the tags associated with those resources.

Figure 5:
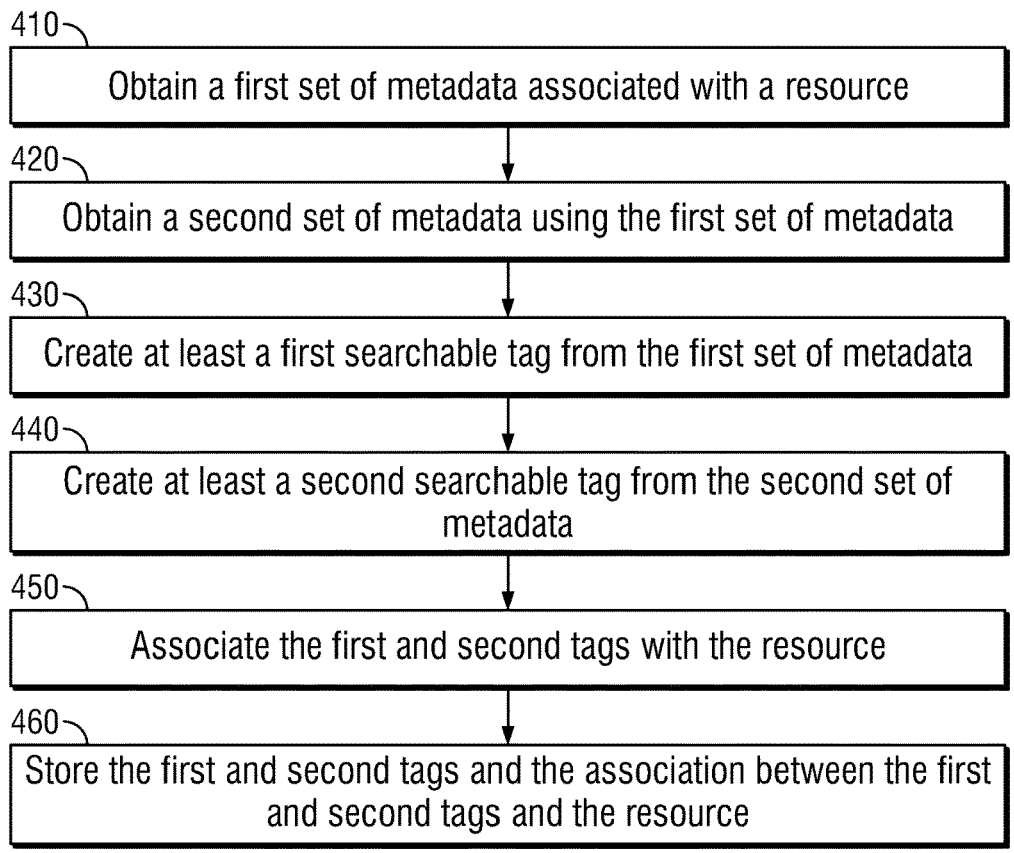
FIG. 5 is a flowchart showing one example of a process for enhancing the searchability of resources stored on a computer-readable storage medium.

FIG. 5 is a flowchart of an exemplary processing for enhancing the searchability of resources stored on a computer-readable storage medium. The process begins at block 410 when a first set of metadata is obtained. The metadata is associated with the resource stored on the computer-readable storage medium. At block 420 the first set of metadata is used to obtain a second set of metadata. For example, some of the metadata in the first set of metadata may be used as one or more search terms to locate the second set of metadata. Next, at block 430 at least a first searchable tag is created from the first set of metadata. Likewise, at least a second searchable tag is created from the second set of metadata at block 440. The first and second tags are associated with the resource at block 450. At block 460, the first and second tags and the association between the first and second tags and the resource are stored such that the first and second tags and the resource are retrievable by a search engine.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 6:
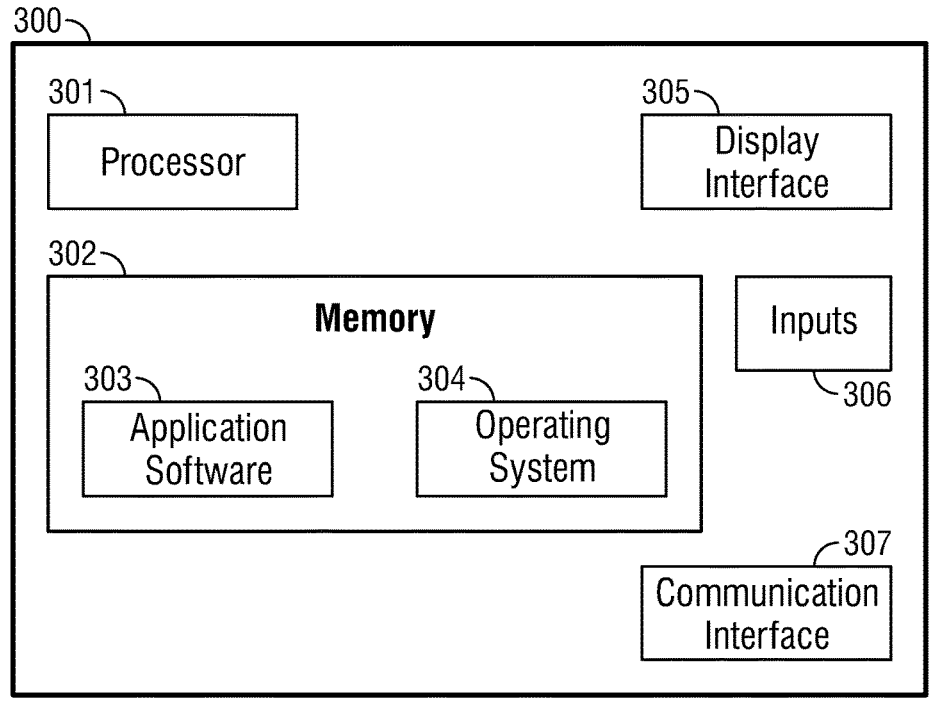
FIG. 6 illustrates various components of an illustrative computing-based device.

FIG. 6 illustrates various components of an illustrative computing-based device 300 which may be implemented as any form of a computing and/or electronic device, and in which embodiments of a search augmentation system may be implemented.

The computing-based device 300 comprises one or more inputs 306 which are of any suitable type for receiving media content, Internet Protocol (IP) input, activity tags, activity state information, resources or other input. The device also comprises communication interface 307 to enable the device to communicate with one or more other entity using any suitable communications medium.

Computing-based device 300 also comprises one or more processors 301 which may be microprocessors, controllers or any other suitable type of processors for processing computing executable instructions to control the operation of the device in order to provide a search augmentation system. Platform software comprising an operating system 304 or any other suitable platform software may be provided at the computing-based device to enable application software 303 to be executed on the device.

The computer executable instructions may be provided using any computer-readable media, such as memory 302. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 305 is provided to control a display device to be used in conjunction with the computing device. The display system may provide a graphical user interface, or other user interface of any suitable type.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium. One or more processors may perform the necessary tasks.

The invention claimed is:

1. A method for enhancing the searchability of resources stored on a non-transitory computer-readable storage medium, comprising:
    obtaining a first set of metadata associated with a resource stored on the computer-readable storage medium, wherein obtaining the first set of metadata includes extracting a machine tag from the resource, the machine tag encoded with actual content in the resource and being uninterpretable to a user without machine translation, and querying over a network a remote first metadata database requesting the first set of metadata, the query including the machine tag extracted from the resource;
    using the first set of metadata to obtain a second set of metadata, associated with the same resource, from a remote second metadata database, wherein using the first set of metadata to obtain the second set of metadata includes sending at least a portion of the first set of metadata to the remote second metadata database over a network;
    creating at least a first searchable tag from the first set of metadata;
    creating at least a second searchable tag from the second set of metadata;
    associating the first searchable tag and the second searchable tag with the resource, wherein the first searchable tag and second searchable tag are embedded with the resource from which the machine tag encoded with actual content in the resource was extracted; and
    storing the first searchable tag and the second searchable tag and the association between first searchable tag and the second searchable tag and the resource such that first searchable tag and the second searchable tag and the resource embedded in each of the first searchable tag and the second searchable tag are retrievable by a search engine,
    wherein upon receiving a user search request, in response thereto searching a plurality of resources using the first searchable tag and the second searchable tag to identify at least one resource that satisfies the user search request.

2. The method of claim 1, wherein the query includes information extracted from the resource that is used by the metadata database to locate the first set of metadata.

3. The method of claim 2, wherein the information extracted from the resource includes a sample of content from the resource, the sample serving as a fingerprint usable by the metadata database to identify the resource.

4. A search augmentation system, comprising:
    a processor;
    a metadata request module, implemented by the processor, configured to obtain a first set of metadata associated with a resource stored on a first metadata database, the metadata request module being further configured to use the first set of metadata to obtain a second set of metadata from a remote second metadata database, wherein using the first set of metadata to obtain the second set of metadata includes sending at least a portion of the first set of metadata to the remote second metadata database over a network, and wherein the metadata request module is further configured to obtain the first set of metadata by extracting a machine tag from the resource, the machine tag encoded with actual content in the resource and being uninterpretable to a user without machine translation, to interpret the machine tag to extract the first set of metadata therefrom, and to query the remote first metadata database over a network requesting the first set of metadata, the query including the machine tag extracted from the resource;
    a search augmentation module, implemented by the processor, configured to create at least a first searchable tag from the first set of metadata and at least a second searchable tag from the second set of metadata; and
    a metadata association module, implemented by the processor, configured to associate the first searchable tag and the second searchable tag with the resource, wherein the first searchable tag and second searchable tag are embedded with the resource from which the machine tag encoded with actual content in the resource was extracted, the search augmentation module, implemented by the processor, being further configured to store the first searchable tag and the second searchable tag and the association between the first searchable tag and the second searchable tag and the resource such that the first searchable tag and the second searchable tag and the resource embedded in the first searchable tag and the second searchable tag are retrievable by a search engine; and a search engine module, implemented by the processor, configured to receive a user search request and in response thereto search a plurality of resources and the first searchable tag and the second searchable tag to identify at least one resource that satisfies the user search request.

5. The search augmentation system of claim 4, wherein the information extracted from the resource includes a sample of content from the resource, the sample serving as a fingerprint usable by the metadata database to identify the resource.

6. A client device, comprising:

a processor;

a memory for storing a plurality of resources;

a metadata request module, implemented by the processor and configured to obtain a first set of metadata associated with a resource stored in the memory on a first metadata database, the metadata request module being further configured to use the first set of metadata to obtain a second set of metadata associated with the same resource from a remote second metadata database, wherein using the first set of metadata to obtain the second set of metadata includes sending at least a portion of the first set of metadata to the remote second metadata database over a network, wherein the metadata request module is further configured to query a remote first metadata database over a network requesting the first set of metadata, the query to the remote first metadata database including machine tag information encoded with actual content in the resource and extracted from the resource that is used by the remote first metadata database to locate the first set of metadata;

a search augmentation module, implemented by the processor, configured to create at least a first searchable tag from the first set of metadata and at least a second searchable tag from the second set of metadata;

a metadata association module, implemented by the processor, configured to associate the first searchable tag and the second searchable tag with the resource, wherein the first searchable tag and the second searchable tag are embedded with the resource from which the machine tag encoded with actual content in the resource was extracted, the search augmentation module, implemented by the processor, being further configured to store the first searchable tag and the second searchable tag and the association between the first searchable tag and the second searchable tag and the resource such that the first searchable tag and the second searchable tag and the resource embedded in the first searchable tag and the second searchable tag are retrievable by a search engine; and a search engine, implemented by the processor, configured to receive a user search request and in response thereto search the plurality of resources and the first searchable tag and the second searchable tag to identify at least one resource that satisfies the user search request.

* * * * *